United States Patent
Huang et al.

(10) Patent No.: US 7,260,528 B2
(45) Date of Patent: Aug. 21, 2007

(54) SYSTEM AND METHOD FOR OBTAINING RELIABLE SPEECH RECOGNITION COEFFICIENTS IN NOISY ENVIRONMENT

(75) Inventors: Tai-Huei Huang, Yunlin Hsien (TW); Shun-Ju Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 853 days.

(21) Appl. No.: 10/445,923

(22) Filed: May 28, 2003

(65) Prior Publication Data

US 2004/0122665 A1 Jun. 24, 2004

(30) Foreign Application Priority Data

Dec. 23, 2002 (TW) .............................. 91137076 A

(51) Int. Cl.
*G10L 21/02* (2006.01)
(52) U.S. Cl. ...................... 704/233; 704/226
(58) Field of Classification Search ................ 704/226, 704/233
See application file for complete search history.

(56) References Cited

U.S. PATENT DOCUMENTS

| | | | | |
|---|---|---|---|---|
| 6,009,391 | A * | 12/1999 | Asghar et al. | 704/243 |
| 6,633,843 | B2 * | 10/2003 | Gong | 704/233 |
| 2002/0062211 | A1 * | 5/2002 | Li et al. | 704/236 |
| 2003/0115054 | A1 * | 6/2003 | Iso-Sipila | 704/233 |

\* cited by examiner

*Primary Examiner*—Abul K. Azad
(74) *Attorney, Agent, or Firm*—Bacon & Thomas, PLLC

(57) ABSTRACT

The present invention provides a method and a system for determining reliable speech recognition coefficients in noisy environment, which can increase the recognition rate in a noisy environment, such as an in-car environment. The present invention utilizes the feature that most of the energy of in-car noise is concentrated in the low frequency band. Therefore, the input speech signal is filtered to remove the signal at the frequency range in which the noise energy is concentrated. Then, the energy contour of the speech signal is calculated, so as to determine the related speech recognition coefficients. Accordingly, the influence caused by the noise can be reduced, and the recognition rate for the noisy speech can be improved.

14 Claims, 6 Drawing Sheets clean speech speech with 6 dB SNR speech with 0 dB SNR

SYSTEM AND METHOD FOR OBTAINING RELIABLE SPEECH RECOGNITION COEFFICIENTS IN NOISY ENVIRONMENT

BACKGROUND OF THE INVENTION

1. Field of the Invention

The present invention relates to the technical field of speech recognition and, more particularly, to a system and a method for obtaining reliable speech recognition coefficients in noisy environment.

2. Description of Related Art

Due to the progress of speech recognition technology, the use of speech recognition to control various machines has made our life more convenient. For example, in an office environment, it is able to correctly perform data input, identity recognition, controlling computer, etc., by speech recognition. However, in a noisy environment, such as in a car, the accuracy of recognition is seriously degraded as the noise enters the recognition system. As a result, the effect of speech recognition application is not satisfactory.

In addition, according to the actual driving test, the use of speech recognition to control the car can indeed effectively reduce the number of errors made by the driver. Furthermore, the combination of car and navigation system or intelligent road safety system will be a major issue in the development of car or information technology. Therefore, to conveniently and safely obtain network information has become an important topic for the driver. Because of the directness and convenience of communication by speech, such a speech technique will doubtless play an important role in obtaining information from a mobile network. However, different from the general office environment as aforementioned, speech recognition in a car environment must encounter a more severe noise problem. Besides, under the consideration of cost, the hardware resource is also restricted.

According to the prior art, the slope of speech energy waveform is an important coefficient for speech recognition. With reference to FIG. 1, in a car environment, the contour of speech is completely destroyed due to strong noise, resulting in an invalid contour identification. As known in the prior art, a typical speech energy $E_t$ can be expressed as follows:

$$E_t = \frac{1}{N}\sum_{i=1}^{N} x_t^2[i] \quad (1)$$

where N is the number of speech samples in a frame and $x_t[i]$ is the i-th speech sample. The frequently used first and second orders of delta coefficient representing dynamic features that describe the variation rate as time goes can be expressed as follows:

$$\frac{d\log(E_t)}{dt} \cong \frac{1}{T_D}\sum_{i=-D}^{D} i\log(E_{t+i}) \quad (2)$$

$$\frac{d^2\log(E_t)}{dt^2} \cong \frac{d\log(E_{t+1})}{dt} - \frac{d\log(E_{t-1})}{dt} \quad (3)$$

where D is the number of speech frames across and $$T_D = \sum_{i=-D}^{D} i^2.$$

In a less noisy environment, a combination of the above dynamic features and coefficient vectors consisting of other spectrum coefficients can increase the speech recognition accuracy. However, with reference to FIG. 2, in the car environment, a logarithmic energy contour is obtained by calculating $$E_t = \frac{1}{N}\sum_{i=1}^{N} x_t^2[i].$$

This contour is not desirable because severe noise has completely destroyed the contour of the speech energy obtained from equation (1), resulting in an invalid contour identification.

Therefore, it is desirable to provide a novel system and method for obtaining reliable speech recognition coefficients in a noisy environment so as to increase the speech recognition accuracy.

SUMMARY OF THE INVENTION

An object of the present invention is to provide a system and a method for obtaining reliable speech recognition coefficients in a noisy environment, wherein the logarithmic energy waveform of speech without being interfered by noise is used to calculate dynamic coefficients for increasing speech recognition accuracy.

Another object of the present invention is to provide a system and a method for obtaining reliable speech recognition coefficients in a noisy environment by using the logarithmic energy waveform of speech without being interfered by noise to calculate dynamic coefficients, which can be easily implemented by hardware as the required calculation complexity is low.

In accordance with one aspect of the present invention, there is provided a speech recognition coefficient generation system for obtaining reliable energy coefficients and derivative dynamic coefficients from an input speech signal having a plurality of speech frames in a noisy environment. In the system, a noise filter is provided for filtering the input speech signal so as to remove signal in a frequency range in which noise energy is concentrated. An energy calculation module is provided for calculating a speech energy of the filtered input speech signal. An energy derivative coefficient calculation module is provided for calculating dynamic coefficients that are the variation rates of logarithmic energy of segmented input speech.

In accordance with another aspect of the present invention, there is provided a speech recognition coefficient generation system for obtaining reliable energy coefficients and derivative dynamic coefficients from an input speech signal in a noisy environment. In the system, a spectral feature extraction module including a filter bank having a plurality of band-pass filters is provided for respectively filtering the input speech signal to generate a plurality of speech energy sections in a plurality of frequency bands respectively. A selection module is provided for selecting speech energy without being interfered by noise from the speech energy sections outputted from the filter bank. An energy calculation module is provided for accumulating the selected speech energy sections. An energy derivative coefficient calculation module is provided for calculating the dynamic coefficients of the logarithmic values of the accumulated energies for all speech frames.

In accordance with a further aspect of the present invention, there is provided a speech recognition coefficient generation method for obtaining reliable energy coefficients and their relevant derivative coefficients from an input speech signal in a noisy environment. First, the input speech signal is filtered to remove signal in a frequency range in which noise energy is concentrated. Then, a logarithmic value of energy contour of the speech signal is calculated. Finally, dynamic coefficients are obtained from the logarithmic value of the energy contour.

Other objects, advantages, and novel features of the invention will become more apparent from the detailed description when taken in conjunction with the accompanying drawings.

DETAILED DESCRIPTION OF THE PREFERRED EMBODIMENT

Figure 3:
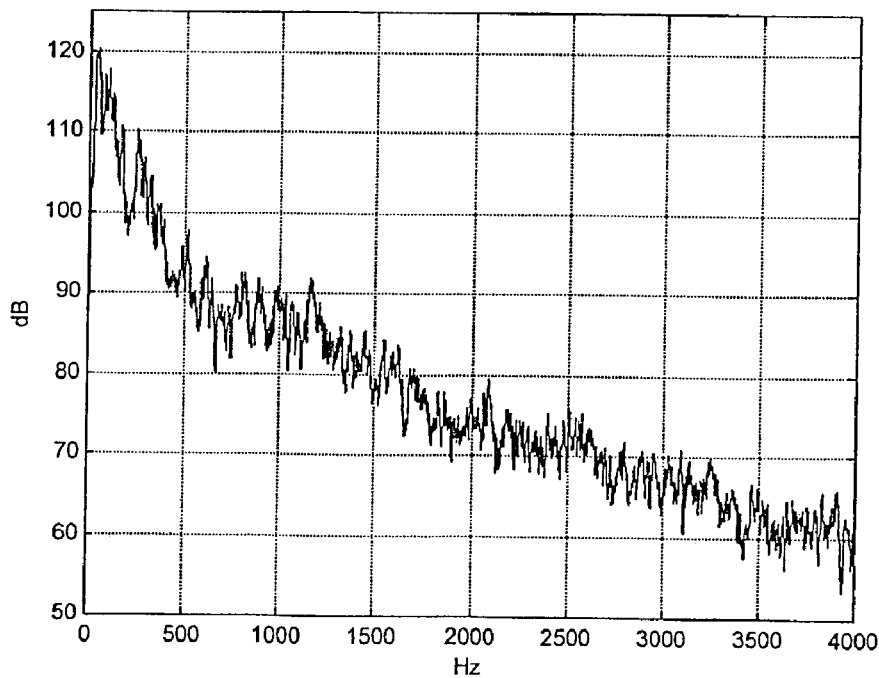
FIG. 3 illustrates a logarithmic energy spectrum recorded in a running car.

In order to utilize the related coefficients of the energy waveform to increase the recognition rate, in the design of the system and method for obtaining reliable speech recognition coefficients in a noisy environment according to the present invention, the energy spectrum of the noise is first analyzed to determine the distribution of the noise energy, so as to define the frequency band in which the noise energy is concentrated. With reference to FIG. 3, there is shown an energy spectrum of pure car noise. As seen, the spectral energies of the frequencies above 500 Hz are 20 dB smaller than the peak energy. Hence, a better energy waveform representation can be obtained if the energy waveform of input speech signals can be represented in terms of energy of noninterference frequency.

Figure 4:
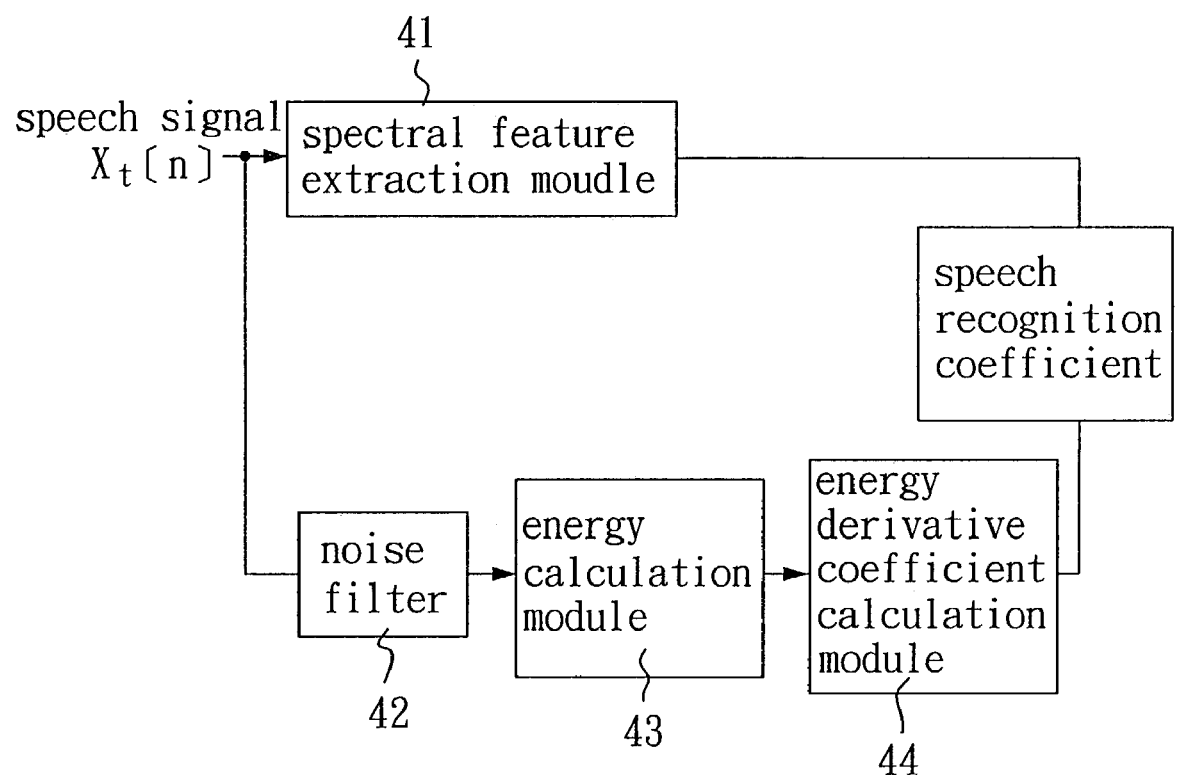
FIG. 4 is a block diagram of a system for obtaining reliable speech recognition coefficients in noisy environment according to the invention.

Based on the above analysis, with reference to FIG. 4, there is shown a block diagram of a system according to the present invention, in which, similar to the conventional speech recognition process, an input speech signal $x_t[n]$ is processed by a spectral feature extraction module 41 for generating speech recognition coefficients. However, for obtaining reliable dynamic coefficients in a noisy environment, the input speech signal $x_t[n]$ is also fed to a noise filter 42 for filtering out the signals in the frequency band in which the noise energy is concentrated. The filtered speech signal is in turn fed to an energy calculation module 43 for determining its speech energy. The speech energy is finally sent to an energy derivative coefficient calculation module 44 for computing the dynamic coefficients.

Figure 5:
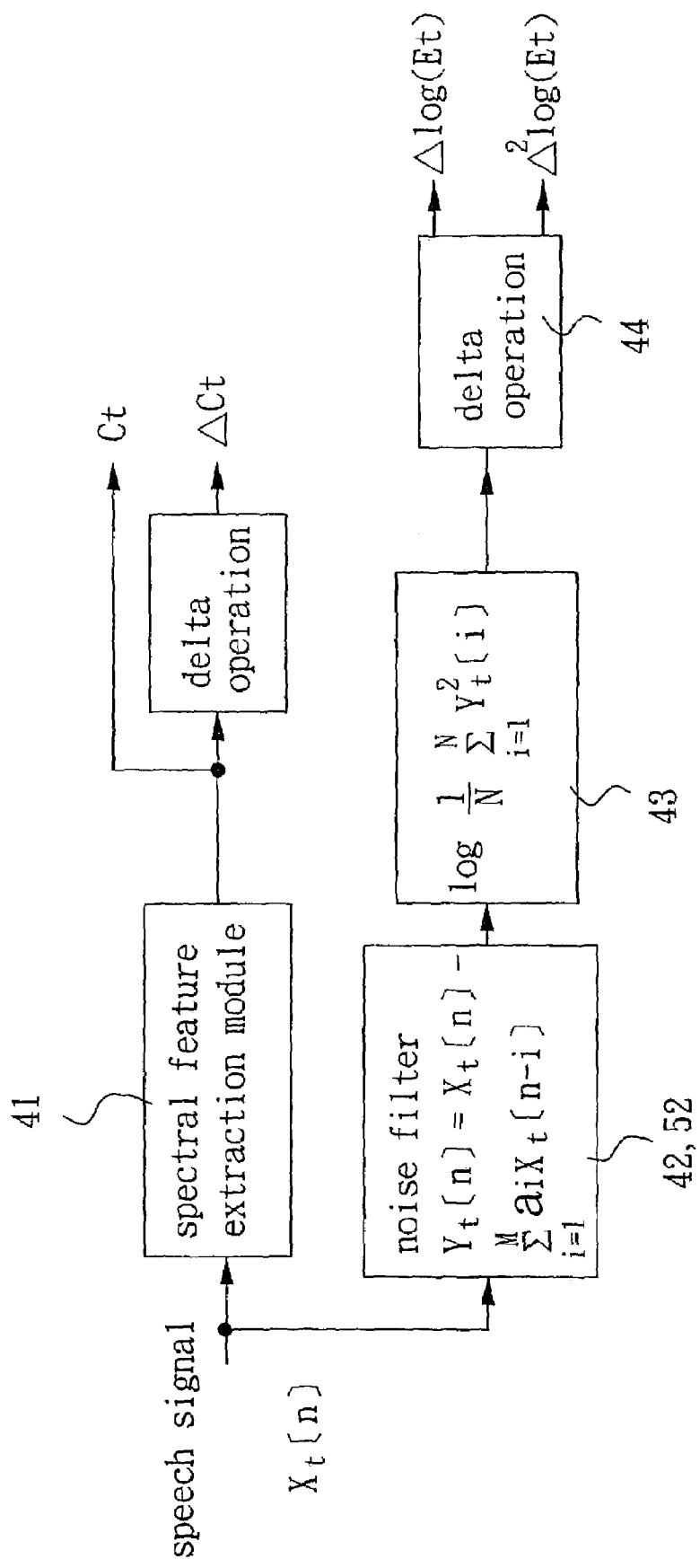
FIG. 5 shows an embodiment for implementing the system for obtaining reliable speech recognition coefficients in noisy environment according to the present invention.

With reference to FIG. 5, there is shown a preferred embodiment for implementing the system for obtaining reliable speech recognition coefficients in noisy environment in accordance with the present invention. As shown, the input speech signal $x_t[n]$ is processed by the spectral feature extraction module 41 for generating a set of cepstrum coefficients $c_t$, which is further processed via a delta operation to generate a set of differential cepstrum coefficients $\Delta c_t$. The noise filter 42 can be implemented by a digital filter 52 which is defined by the differential equation:

$$y_t[n] = x_t[n] - \sum_{i=1}^{M} a_i x_t[n-i], \quad (4)$$

where M is the order of the differential equation, $a_i$ is the i-th coefficient of the digital filter, and $x_t[n]$ is the n-th signal in the t-th speech frame of the input speech signal. Based on the major noise characteristics in a specific application, for example in a car environment, the $\{a_i\}$ can be obtained by performing a linear predictive coding (LPC) analysis on a noise sample recorded in the car.

The filtered input speech signal is then fed to the energy calculation module 43. With the energy calculation module 43, a logarithmic value of energy contour is obtained by calculating a logarithmic value of the sum of the square of each sampled speech frame, which is given follows:

$$\log(E_t) = \log\left(\frac{1}{N}\sum_{i=1}^{N} y_t^2[i]\right).$$

Figure 1:
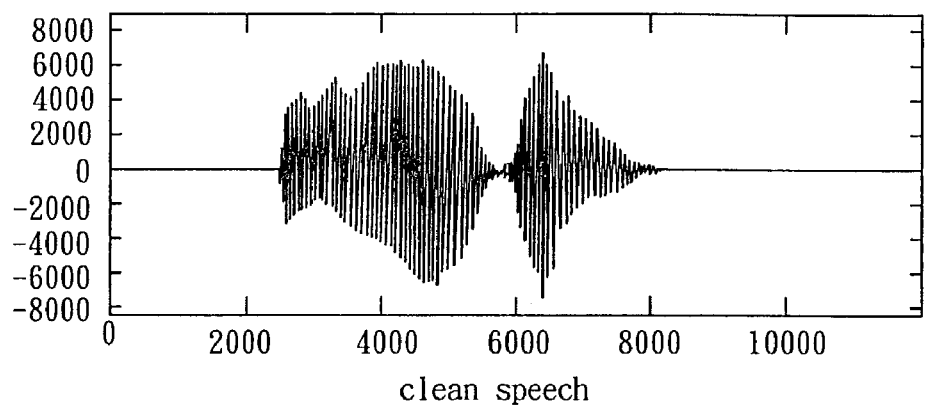
FIG. 1 illustrates speech waveforms recorded in a clean environment and two noisy environments with different SNRs respectively.
Figure 1:
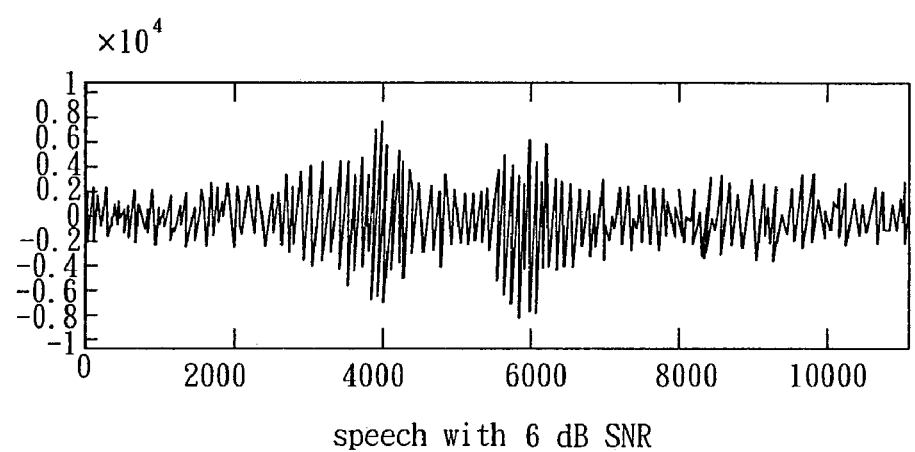
Figure 1:
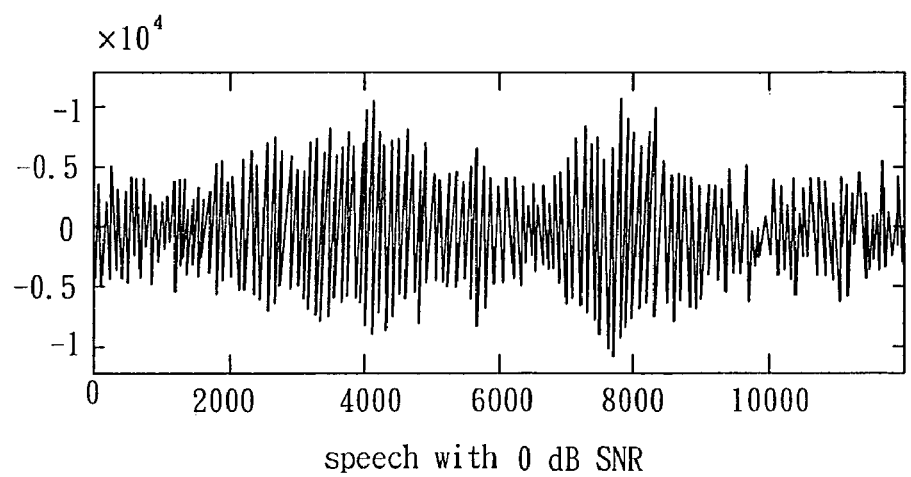
Figure 2:
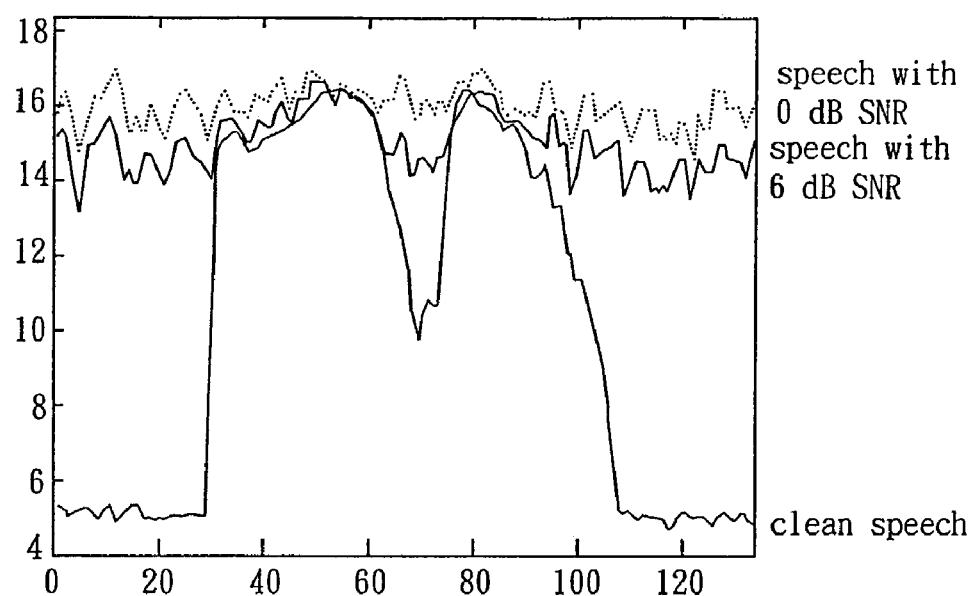
FIG. 2 is a graph of logarithmic energy waveform obtained by a conventional speech signal calculation technique.
Figure 6:
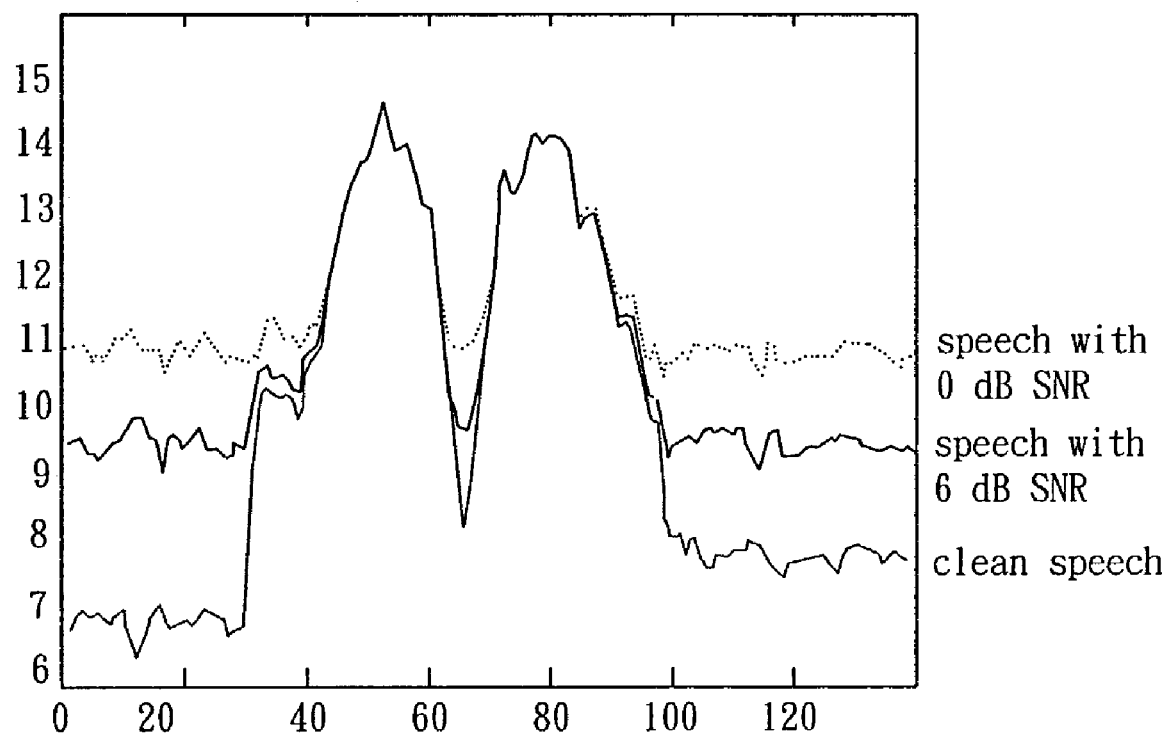
FIG. 6 shows a logarithmic energy curve of input speech signal obtained by filtering out the low frequency portion in accordance with the present invention.

FIG. 6 illustrates a logarithmic energy curve of input speech signal obtained by filtering out the low frequency portion with a second order (M=2) LPC filter according to the present invention. As compared with the graph shown in FIG. 2, it shows that the contour of the curve in FIG. 6 can be easily identified. The logarithmic value of this energy contour is further processed by a delta operation with the energy derivative coefficient calculation module 44 for obtaining a first order dynamic coefficient $\Delta \log(E_t)$ and a second order dynamic coefficient $\Delta^2 \log(E_t)$.

Figure 7:
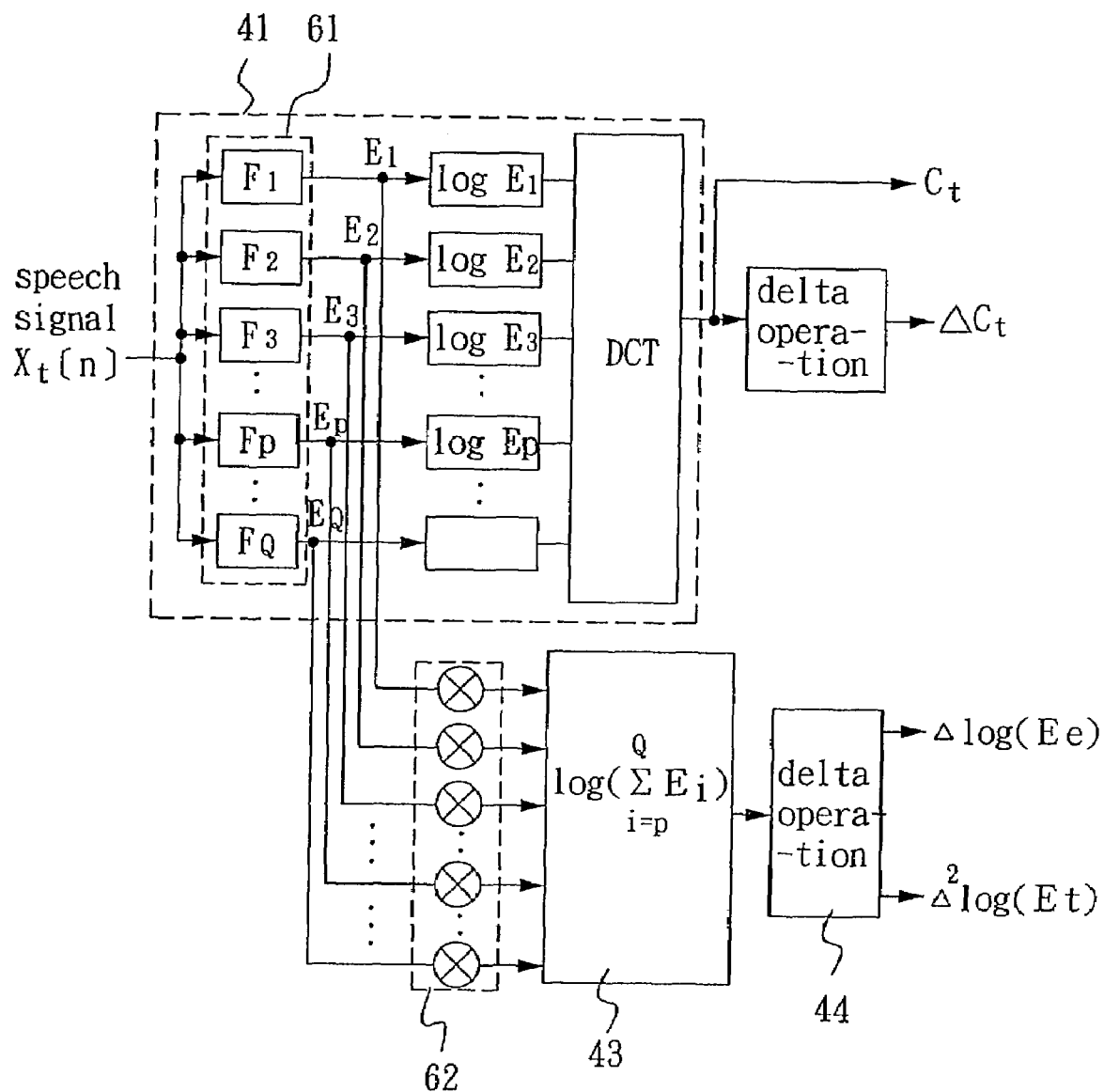
FIG. 7 shows another embodiment for implementing the system for obtaining reliable speech recognition coefficients in noisy environment according to the present invention.

FIG. 7 shows another preferred embodiment for implementing the system for obtaining reliable speech recognition coefficients in noisy environment in accordance with the present invention. As shown, the input speech signal $x_t[n]$ is processed by the spectral feature extraction module 41 for generating a set of cepstrum coefficients $c_t$. In this embodiment, the spectral feature extraction module 41 is implemented as a filter bank 61 comprised of a plurality of band-pass filters $F_1$ to $F_Q$ for filtering the speech signal $x_t[n]$ in a plurality of frequency bands respectively wherein frequency bands of the band-pass filters $F_1$ to $F_Q$ are arranged sequentially based on their magnitudes. As such, a plurality of speech energy sections $E_1$ to $E_Q$ are generated corresponding to the frequency bands, respectively. Furthermore, each of the speech energy sections $E_1$ to $E_Q$ is processed for obtaining a logarithmic value thereof. The logarithmic values are processed by a discrete cosine transform (DCT) to obtain the corresponding cepstrum coefficients $c_r$. The cepstrum coefficients are further processed by a delta operation to generate differential cepstrum coefficients $\Delta c_r$. In order to obtain the energy coefficients, a selection module 62 is used to directly select the energy without being interfered by noise from the speech energy sections $E_1$ to $E_Q$ outputted from the filter bank 61. In the car environment, the frequency bands larger than 500 Hz, for example the speech energy sections $E_P$ to $E_Q$, are selected and fed to the energy calculation module 43A, so as to accumulate the selected energies and calculate the logarithmic value of the accumulation for determining the logarithmic value of energy contour. The logarithmic value of energy contour is then processed by a delta operation with the energy derivative coefficient calculation module 44 for obtaining a first order dynamic coefficient $\Delta \log(E_t)$ and a second order dynamic coefficient $\Delta^2 \log(E_t)$. Accordingly, it is possible to obtain reliable speech recognition coefficients in a noisy environment without involving additional noise filters.

For verifying the advantageous effect in speech recognition obtained by the present invention, the conventional method, the first embodiment (i.e., LPC filter method) and the second embodiment (i.e., band-pass filter method) are used to perform a name recognition experiment, and the accuracies of the recognitions are compared. In the experiment, the training utterance of speech model is a database recorded with telephone voices of about 2,000 persons. The clean testing voices are recorded in a quite room wherein 18 males and 11 females speak 120 names through a microphone. The noisy testing voices are given by artificially synthesizing the clean testing voices and car noise samples based on SNRs of 6 dB, 0 dB, and −6 dB. In the experiment, the car noise sample can be recorded in a car running on a highway or on a street. The target of the experiment is to recognize a total of 1,073 names. The training utterance and testing utterance are both processed by the same speech energy contour calculation method. In the LPC method, the filter coefficients are a set of coefficients obtained from the highway car noise. In the experiment, the order of LPC filter is two and there are 24 band-pass filters in the filter bank, wherein the sixth to the 24th band-pass filters are selected for calculating energy contour. A speech feature vector is comprised of 26 coefficients, i.e., twelve Mel-frequency cepstrum coefficients (MFCCs), twelve delta MFCCs, one delta log energy, and one delta delta log energy. The experiment result is illustrated in Table 1, from which it is known that the recognition rate of the present invention is better than that of the prior art under various testing conditions.

TABLE 1

Recognition accuracies using various methods (%)

|  | 6 dB | 0 dB | −6 dB |
| --- | --- | --- | --- |
| Highway car noise | | | |
| Prior art | 88.4 | 73.8 | 47.1 |
| Band-pass filter | 92.0 | 80.5 | 56.4 |
| LPC filter | 92.2 | 80.6 | 57.8 |
| Street car noise | | | |
| Prior art | 92.5 | 86.7 | 73.8 |

TABLE 1-continued

Recognition accuracies using various methods (%)

|  | 6 dB | 0 dB | −6 dB |
| --- | --- | --- | --- |
| Band-pass filter | 95.4 | 92.3 | 83.2 |
| LPC filter | 95.6 | 92.4 | 83.4 |

In view of the foregoing, it is known that the present invention is able to obtain the related coefficients of the energy waveform based on part of the speech spectral energy. Based on the experiment, it is able to effectively improve the recognition rate for noisy speech by using the coefficients of energy waveform obtained in the present invention incorporating with the other typical speech recognition coefficients. In addition, the calculation complexity is low, and thus the present invention can be easily implemented in a hardware system.

Although the present invention has been explained in relation to its preferred embodiment, it is to be understood that many other possible modifications and variations can be made without departing from the spirit and scope of the invention as hereinafter claimed.

What is claimed is:

1. A speech recognition coefficient generation system for obtaining reliable energy coefficients and their relevant derivative coefficients from an input speech signal having a plurality of speech frames in a noisy environment, the system comprising:

a noise filter for filtering the input speech signal so as to remove a part of the input speech signal in a frequency range in which noise energy is concentrated, leaving a remainder of the input speech signal from which the part has been removed;

an energy calculation module for calculating a speech energy of the remainder of the filtered input speech signal from which a part has been removed; and an energy derivative coefficient calculation module for calculating said derivative coefficients, said derivative coefficients being variation rates of a logarithmic value of said speech energy of the remainder of the filtered input speech signal.

2. The system as claimed in claim 1, wherein the noise filter is a digital filter defined by a differential equation as follows:

$$y_t[n] = x_t[n] - \sum_{i=1}^{M} a_i x_t[n-i],$$

where M is the order of the differential equation, $a_i$ is the I-th coefficient of the filter, and $x_t[n]$ is the n-th signal in the t-th speech frame of the input speech signal.

3. The system as claimed in claim 2, wherein the coefficient of the digital filter $\{a_i\}$ is obtained by performing a linear prediction on a noise sample.

4. The system as claimed in claim 2, wherein the energy calculation module determines a logarithmic value of energy contour by calculating a logarithmic value of the sum of the square of each speech sample in a frame of input speech.

5. The system as claimed in claim 4, wherein the energy derivative coefficient calculation module performs a delta operation on the logarithmic value of the energy contour for obtaining the dynamic coefficients.

6. The system as claimed in claim 1, further comprising a spectral feature extraction module for processing the input speech signal to generate cepstrum coefficients.

7. A speech recognition coefficient generation system for obtaining reliable energy coefficients and their relevant derivative dynamic coefficients from an input speech signal in a noisy environment, comprising:
- a spectral feature extraction module including a filter bank having a plurality of band-pass filters for respectively filtering the input speech signal to generate a plurality of speech energy sections in a plurality of frequency bands respectively;
- a selection module for selecting, from the speech energy sections output by the filter bank, only those speech energy sections that are least likely to be interfered with;
- an energy calculation module for accumulating and calculating speech energies of the selected speech energy sections; and
- an energy derivative coefficient calculation module for calculating the dynamic coefficients of logarithmic values of the accumulated speech energy sections.

8. The system as claimed in claim 7, wherein the energy calculation module accumulates the selected speech energy sections prior to performing a logarithmic operation on the accumulated speech energy for obtaining a logarithmic energy contour.

9. The system as claimed in claim 8, wherein the energy derivative coefficient calculation module performs a delta operation on the logarithmic value of the energy contour for obtaining the dynamic coefficients.

10. The system as claimed in claim 7, wherein the spectral feature extraction module further comprises logarithmic and discrete cosine transform (DCT) operation means for performing a logarithmic operation on each speech energy section to obtain a logarithmic value of each speech energy section and processing the logarithmic value of each speech energy section to generate cepstrum coefficients.

11. The system as claimed in claim 10, wherein the energy derivative coefficient calculation module performs a delta operation on the logarithmic value of the cepstrum coefficients for obtaining dynamic coefficients.

12. The system as claimed in claim 7, wherein frequency bands of the band-pass filters are arranged sequentially based on their magnitudes.

13. a speech recognition coefficient generation method for obtaining reliable energy coefficients and their relevant derivative coefficients from an input speech signal in a noisy environment, comprising the steps of:
- (a) filtering the input speech signal to remove a part of the input speech signal in a frequency range in which noise energy is concentrated, leaving a remainder of the input speech signal from which the part has been removed;
- (b) calculating a logarithmic value of an energy contour of the remainder of the input speech signal obtained in step (a); and
- (c) obtaining said derivative dynamic coefficients from the logarithmic value of the energy contour.

14. The method as claimed in claim 13, wherein in the step (c) the dynamic coefficients are determined by delta.

* * * * *